United States Patent
Naqvi et al.

(10) Patent No.: US 9,611,931 B2
(45) Date of Patent: Apr. 4, 2017

(54) METHOD TO DETECT LOSS OF FLUID OR BLOCKAGE IN A HYDRAULIC CIRCUIT USING EXPONENTIALLY WEIGHTED MOVING AVERAGE FILTER

(75) Inventors: Ali K. Naqvi, White Lake, MI (US); Andrew M. Zettel, Ann Arbor, MI (US); Vincent Rawls, Farmington Hills, MI (US); Nicholas Kokotovich, Pleasant Ridge, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1173 days.

(21) Appl. No.: 13/479,629

(22) Filed: May 24, 2012

(65) Prior Publication Data

US 2013/0313048 A1 Nov. 28, 2013

(51) Int. Cl.

| F16N 29/04 | (2006.01) |
|---|---|
| F16N 29/00 | (2006.01) |
| G06F 11/30 | (2006.01) |
| F16N 7/38 | (2006.01) |
| F16H 61/12 | (2010.01) |
| F16H 57/04 | (2010.01) |
| F16H 61/00 | (2006.01) |

(52) U.S. Cl.
CPC ......... F16H 61/12 (2013.01); F16H 57/0442 (2013.01); F16H 61/0031 (2013.01); F16H 2061/1208 (2013.01)

(58) Field of Classification Search
None
See application file for complete search history.

(56) References Cited

U.S. PATENT DOCUMENTS

| 4,809,504 A * | 3/1989 | Izumi .................... F04B 49/08 417/216 |
|---|---|---|
| 6,167,702 B1 * | 1/2001 | Schniederjan .......... E02F 9/123 60/444 |
| 6,183,210 B1 * | 2/2001 | Nakamura ............ E02F 9/2235 417/222.1 |
| 8,473,252 B2 * | 6/2013 | Kar .................... G05B 23/0221 340/679 |
| 8,538,649 B2 * | 9/2013 | Runde .................. F16H 61/143 192/3.31 |
| 2009/0165548 A1 * | 7/2009 | Pop ...................... E21B 49/008 73/152.51 |
| 2009/0259375 A1 * | 10/2009 | Runde .................. F16H 61/143 701/59 |
| 2010/0036572 A1 * | 2/2010 | Kluemper ............. F16H 61/143 701/67 |

(Continued)

Primary Examiner — Jean-Paul Cass

(57) ABSTRACT

Method for detecting a fault condition in a vehicular hydraulic circuit during a drive cycle using an electric pump includes monitoring an actual pump torque and monitoring a desired pump torque. A current confidence factor is determined based on the actual pump torque and the desired pump torque. An average confidence factor is iteratively calculated based on the current confidence factor and previously determined confidence factors. The average confidence factor is compared to a fault condition threshold. An absence of the fault condition in the hydraulic circuit is detected when the average confidence factor is at least the fault condition threshold, and a presence of the fault condition in the hydraulic circuit is detected when the average confidence factor is less than the fault condition threshold.

9 Claims, 2 Drawing Sheets

(56) References Cited

U.S. PATENT DOCUMENTS

| | | | |
|---|---|---|---|
| 2010/0138159 A1* | 6/2010 | Conquergood | E21B 19/165 702/9 |
| 2011/0066320 A1* | 3/2011 | Bechtler | B60T 8/885 701/29.2 |
| 2011/0071726 A1* | 3/2011 | Bechtler | B60T 8/3685 701/29.2 |
| 2011/0173965 A1 | 7/2011 | Holmes et al. | |
| 2011/0231071 A1* | 9/2011 | Phillips | B60K 6/485 701/54 |
| 2012/0022700 A1* | 1/2012 | Drees | G05B 15/02 700/276 |
| 2013/0218431 A1* | 8/2013 | Runde | G06F 17/00 701/67 |
| 2014/0245071 A1* | 8/2014 | Drees | G06F 11/079 714/39 |

\* cited by examiner

METHOD TO DETECT LOSS OF FLUID OR BLOCKAGE IN A HYDRAULIC CIRCUIT USING EXPONENTIALLY WEIGHTED MOVING AVERAGE FILTER

TECHNICAL FIELD

This disclosure is related to hydraulic control systems for direct drive transmissions.

BACKGROUND

The statements in this section merely provide background information related to the present disclosure. Accordingly, such statements are not intended to constitute an admission of prior art.

Hydraulic systems for a transmission in a vehicle can lubricate and cool the transmission by communicating a hydraulic fluid from a sump to at least one of a plurality of subsystems of a hydraulic circuit. In battery electric vehicles, the transmission can include a direct drive transmission. Direct drive transmissions do not include gear selection systems utilizing torque transfer devices that are hydraulically activated and deactivated. Therefore, failure conditions including fluid leakage resulting in low fluid levels and hydraulic fluid blockage within the hydraulic circuit will not have any impact on the ability of the transmission to provide output torque for driving the vehicle. However, failure conditions can result in transmission components not being adequately cooled and lubricated. Damage to the transmission components can occur if such failure conditions are not addressed.

It is known, for example, to monitor hydraulic fluid levels within hydraulic control systems by measuring the fluid level within a sump. It is further known, for example, to utilize pressure sensors placed throughout a hydraulic control system to detect hydraulic fluid blockage. Such sensors and measuring devices can add to cost and limit packaging constraints within hydraulic control systems.

SUMMARY

Method for detecting a fault condition in a vehicular hydraulic circuit during a drive cycle using an electric pump includes monitoring an actual pump torque and monitoring a desired pump torque. A current confidence factor is determined based on the actual pump torque and the desired pump torque. An average confidence factor is iteratively calculated based on the current confidence factor and previously determined confidence factors. The average confidence factor is compared to a fault condition threshold. An absence of the fault condition in the hydraulic circuit is detected when the average confidence factor is at least the fault condition threshold, and a presence of the fault condition in the hydraulic circuit is detected when the average confidence factor is less than the fault condition threshold.

BRIEF DESCRIPTION OF THE DRAWINGS

One or more embodiments will now be described, by way of example, with reference to the accompanying drawings, in which.

DETAILED DESCRIPTION

Figure 1:
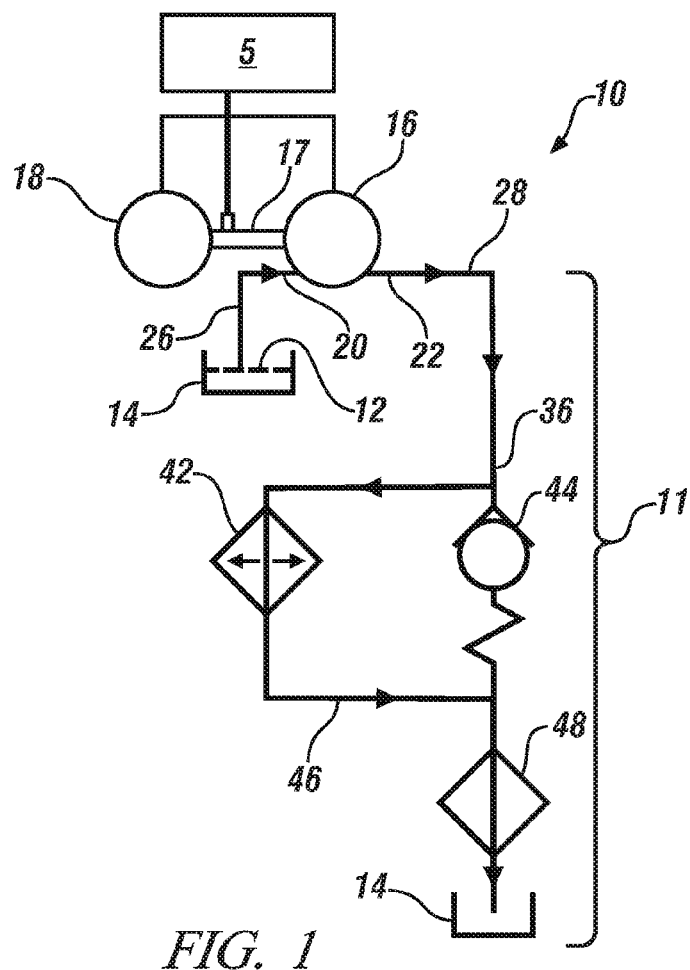
FIG. 1 is a schematic flow diagram of an exemplary hydraulic control system for a transmission operable to lubricate and provide temperature management of the transmission by communicating a hydraulic fluid from a sump to at least one of a plurality of subsystems of a hydraulic circuit.

Referring now to the drawings, wherein the showings are for the purpose of illustrating certain exemplary embodiments only and not for the purpose of limiting the same, FIG. 1 schematically illustrates an exemplary hydraulic control system 10 for a transmission. In an exemplary embodiment, the transmission is a direct drive transmission for a battery electric vehicle. Therefore, the direct drive transmission does not include a gear selection system utilizing torque transfer devices that are hydraulically activated and deactivated. The hydraulic control system 10 is operable to lubricate and provide temperature management of the transmission by communicating a hydraulic fluid 12 from a sump 14 to at least one of a plurality of subsystems of a hydraulic circuit 11. The plurality of subsystems of the hydraulic circuit 11 can include a cooler subsystem 42 and a lubrication and temperature management subsystem 48. However, the hydraulic circuit 11, in some embodiments, may only include the lubrication and temperature management subsystem 48. The sump 14 is a tank or reservoir preferably disposed at the bottom of the transmission to which the hydraulic fluid 14 returns and collects from various components and regions of the transmission. The hydraulic fluid 12 is forced from the sump 14 and communicated throughout the hydraulic circuit 11 via a pump 16. The pump 16 can be an electric pump driven by an electric motor 18. The pump 16 may be, for example, a gear pump, a vane pump, or any other positive displacement pump. The pump includes an inlet port 20 for receiving the hydraulic fluid 12 via a suction line 26 from the sump 14. An outlet port 22 of the electric pump 14 communicates pressurized hydraulic fluid 12 to a supply line 28.

The supply line 28 is in fluid communication with a cooler supply line 36 to distribute the hydraulic fluid 12 to the cooler subsystem 42 and a one-way spring bypass valve 44 disposed in parallel with the cooler subsystem 42. The cooler subsystem 42 is a subsystem of the hydraulic circuit 11 and may include an oil cooler to reduce the temperature of the hydraulic fluid 12. The one-way spring bypass valve 44 allows hydraulic fluid 12 to bypass the cooler subsystem 42 in the event of inadequate cooler flow. The one-way spring bypass valve 44 is set at a predetermined pressure and if the pressure of the hydraulic fluid 12 in the cooler supply line 36 exceeds this pressure, the one-way spring bypass valve 44 opens momentarily to increase the flow of hydraulic fluid 12. Both the cooler subsystem 42 and the one-way spring bypass valve 44 are in fluid communication with a lubrication supply line 46. Embodiments are envisioned where the cooler subsystem 42 and the one-way spring bypass valve 44 are omitted. The lubrication supply line 46 distributes the hydraulic fluid 12 to the lubrication and temperature management subsystem 48. The lubrication and temperature management subsystem 48 is a subsystem of the hydraulic circuit 11 and generally includes various fluid lines, passages, and other components used to deliver the hydraulic fluid 12 to various components within the transmission to lubricate and manage temperature of the various components. The hydraulic fluid 12 then communicates back to the sump 14.

The operation of the hydraulic control system 10 includes operating the electric motor 18 to drive the pump 16 via an output shaft 17. A control module 5 is utilized for controlling the speed of the electric motor 18 to control pump speed and pump torque of the pump 16. Therefore, the control module 5 can command the electric motor 18 to control the pump torque to achieve a desired pump torque corresponding to a pump speed request.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

As aforementioned, direct drive transmissions do not include gear selection systems utilizing torque transfer devices that are hydraulically activated and deactivated. Accordingly, fluid leakage resulting in low fluid levels and hydraulic fluid blockage within the hydraulic circuit will not have any impact on the ability of the transmission to provide output torque for driving the vehicle. However, such failure conditions (e.g., fluid leakage resulting in low fluid levels and hydraulic fluid blockage) can result in transmission components not being adequately cooled and lubricated. Damage to the transmission components can occur if such failures in the hydraulic circuit 11 go undetected.

Figure 2:
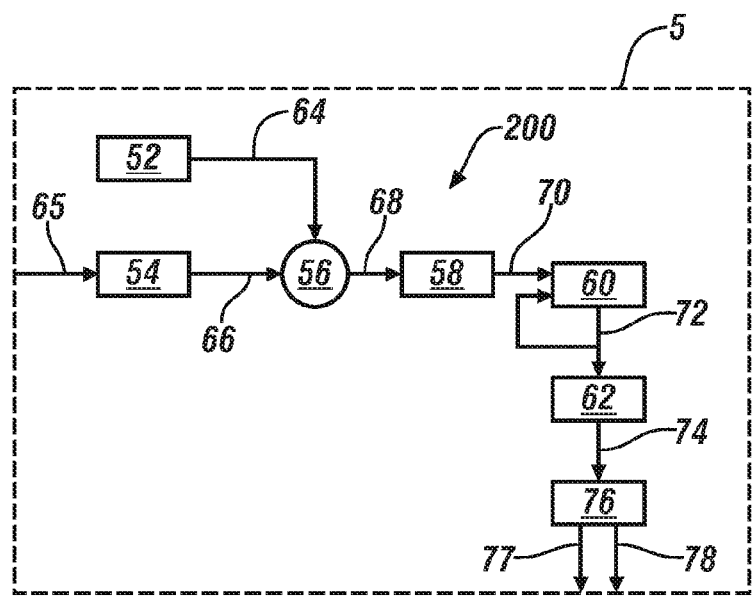
FIG. 2 illustrates a hydraulic circuit fault detection (HCFD) controller 200 for detecting a fault and determining a failure in a hydraulic circuit using a pump.

FIG. 2 illustrates a hydraulic circuit failure determination (HCFD) controller 200 for detecting a fault condition and determining a failure condition in the hydraulic circuit 11 using the pump 16, in accordance with an exemplary embodiment of the present disclosure. The HCFD controller 200 may be imbedded within the control module 5. Therefore, the control module has supervisory control over the HCFD controller 200. The HCFD controller 200 includes a torque module 52, a desired torque module 54, a comparison unit 56, a confidence module 58, an exponentially weighted moving average (EWMA) filter 60, a fault condition detection module 62 and a failure condition determination module 76.

The torque module 52 monitors an actual pump torque 64, $T_P$, that may be measured at the output shaft 17 of the electric motor 18 that drives the pump 16. However, this disclosure is not limited to measuring the actual pump torque 64 at the output shaft 17 and can be obtained and measured by other methods. A current pump speed can also be monitored at the output shaft 17. $T_P$ 64 is input to the comparison unit 56. A desired torque module 54 receives a pump speed request 65 and determines a desired pump torque 66, $T_{P\_DES}$, based on the pump speed request 65. The pump speed request 65 can be provided by the control module 5 to maintain desired flow characteristics of the hydraulic fluid 11 for lubrication and temperature management within the hydraulic circuit. Accordingly, the desired torque module 54 may use look-up tables to determine $T_{P\_DES}$ 66 based on the pump speed request 65. In other words, $T_{P\_DES}$ 66 includes a target pump torque required to achieve the pump speed request 65 for maintaining desired flow characteristics of hydraulic fluid for lubrication and temperature management within the hydraulic circuit 11. $T_{P\_DES}$ 66 is input to the comparison unit 56 and compared with $T_P$ 64.

The comparison unit 56 determines a torque deviation 68 based on comparing $T_P$ 64 and $T_{P\_DES}$ 66. Specifically, the torque deviation 68 is determined if $T_P$ 64 deviates from $T_{P\_DES}$ 66. The torque deviation 68 is input to the confidence module 58.

The confidence module 58 determines a current confidence factor 70 as a function of the torque deviation 68 at a current pump speed during a current iteration. The confidence module can include a look-up table for determining the current confidence factor 70 associated with the torque deviation 68 at the current pump speed. The current confidence factor 70 includes a factor ranging between and including zero ("0") and one ("1"). A confidence factor of "1" relates to a highest level of confidence that the torque deviation 68 at the current pump speed is acceptable. For instance, a confidence factor of "1" would correspond to no torque deviation between the actual pump torque and the desired pump torque. A confidence factor of "0" relates to a lowest level of confidence that the torque deviation 68 at the current pump speed is acceptable. For instance, a confidence factor of "0" would correspond to an unacceptable or impermissible torque deviation between the actual pump torque and the desired pump torque. The confidence factor associated with a torque deviation at a given pump speed can be predetermined during calibration, and obtained using the look-up table, to act as a tolerance for fluctuating torque deviations. As will become apparent, the current confidence factor 70 enables the allowance of some deviation in $T_P$ 64 from $T_{P\_DES}$ 66 without the detection of a fault condition or the determination of a failure condition in the hydraulic circuit 11.

The EWMA filter 60 receives the confidence factor 70 between and including "0" and one "1." The EWMA filter 60 is a statistical filter that can be utilized to iteratively calculate an average confidence factor based on the current confidence factor and an average confidence factor calculated in an immediately preceding iteration. Even more specifically, the EWMA filter 60 can be utilized to iteratively calculate the average confidence factor based on a weighted average between the current confidence factor and the average confidence factor calculated in the immediately preceding iteration. A relationship between the average confidence factor, the current confidence factor 70 and the average confidence factor calculated in the immediately preceding iteration may be expressed as follows:

$$\overline{CF}_i = CF_i * w + \overline{CF}_{i-1} * (1-w) \qquad [1]$$

wherein $\overline{CF}_i$ is the average confidence factor during a current iteration, $CF_i$ is the current confidence factor 70 input to the EWMA filter 60 during the current iteration of the HCFD controller 200, $\overline{CF}_{i-1}$ is the average confidence factor calculated in the immediately preceding iteration, and w is a weighted factor.

Therefore, the weighted factor, w, is applied to $CF_i$ and $\overline{CF}_{i-1}$, wherein the average torque error, $\overline{CF}_i$ 72, is calculated based on the weighted average between $CF_i$ and $\overline{CF}_{i-1}$. The weighted factor, w, allows for an amount of deference applied to each of $CF_i$ 70 and $\overline{CF}_{i-1}$ contributing to the calculation of $\overline{CF}_i$ 72. For instance, a weighted factor of 0.5 applied to Eq. [1] would utilize equal proportions of $CF_i$ and $\overline{CF}_{i-1}$ in yielding $\overline{CF}_i$ 72. In another instance, a weighted factor of 1 applied in Eq. [1] would yield $\overline{CF}_i$ 72 equal to $CF_i$ 70. In yet another instance, a weighted factor of 0 applied in Eq. [1] would yield $\overline{CF}_i$ 72 equal to $\overline{CF}_{i-1}$. The calculated average confidence factor 72 during the current iteration, $\overline{CF}_i$, is input to the fault condition detection module 62. $\overline{CF}_i$ is additionally input back into the EWMA filter 60 for calculating an average confidence factor, $\overline{CF}_{i+1}$, in an immediately subsequent iteration.

The fault condition detection module 62 compares $\overline{CF}_i$ 72 to a condition range defined by a lower limit fault condition threshold and an upper limit acceptance condition threshold. Hence, the acceptance condition threshold is greater than the fault condition threshold. Alternative embodiments include the fault condition threshold and the acceptance condition threshold being the same. An absence of a fault condition in the hydraulic circuit can be detected whenever $\overline{CF}_i$ is at least the fault condition threshold. However, a presence of an acceptance condition is detected only when $\overline{CF}_i$ is greater than the acceptance condition threshold. Accordingly, $\overline{CF}_i$ can be designated as pass-flagged when $\overline{CF}_i$ is greater than the acceptance condition threshold. In one embodiment, the acceptance condition threshold is 0.8. $\overline{CF}_i$ designated as pass-flagged can have a value of "0" associated with a designated output 74 input to the failure condition determination module 76.

If $\overline{CF}_i$ is within the confidence range, the absence of both the fault condition and the acceptance condition is detected. Accordingly, $\overline{CF}_i$ can be designated as un-flagged, and therefore, the designated output 74 during the current iteration will not be monitored by the failure condition module 76.

A presence of a fault condition in the hydraulic circuit can be detected only when $\overline{CF}_i$ is less than the fault condition threshold. Accordingly, $\overline{CF}_i$ can be designated as fault-flagged when $\overline{CF}_i$ is less than the fault condition threshold. In one embodiment, the fault condition threshold is 0.25. $\overline{CF}_i$ designated as fault-flagged can include a positive fault-flag corresponding to a value of "1" or a negative fault-flag corresponding to a value of "(−1)." The positive fault-flag can correspond to a detected fault condition in $\overline{CF}_i$ indicative of insufficient hydraulic fluid levels within the hydraulic circuit. Hence, $\overline{CF}_i$ designated as a positive fault-flag (i.e., "1") specifies that the actual pump torque is greater than the desired pump torque due to the possibility of insufficient hydraulic fluid levels within the hydraulic circuit. The negative fault-flag can correspond to a detected fault condition in $\overline{CF}_i$ indicative of hydraulic fluid blockage within the hydraulic circuit. Hence, $\overline{CF}_i$ designated as a negative fault-flag (i.e., "−1") specifies that the actual pump torque is less than the desired pump torque due to the possibility of hydraulic fluid blockage within the hydraulic circuit. Accordingly, the designated output 74 can be fault-flagged and having a value of "1" or "(−1)" input to the failure condition determination module 76 or the designated output 74 can be pass-flagged and having a value of "0" input to the failure condition determination module 76.

The failure condition determination module 76 receives the designated output 74 indicating the absence (e.g., pass-flagged) or presence (e.g., fault-flagged) of a detected fault condition during each iteration of the controller. As aforementioned, a pass-flagged designated output also indicates the presence of a detected acceptance condition. The failure condition determination module 76 includes a counter for monitoring a plurality of detected fault conditions during a current drive cycle. Likewise, the counter (or a separate counter) of the failure condition determination module 76 monitors a plurality of detected acceptance conditions during the current drive cycle. In an exemplary embodiment, the drive cycle may is initiated in response to a key-on event and terminated in response to a key-off event. The plurality of detected fault conditions can be compared to a failure condition threshold and the plurality of detected acceptance conditions can be compared to a pass condition threshold. If the plurality of detected fault conditions exceed the failure condition threshold, a failure condition 78 can be determined. If the plurality of detected acceptance conditions exceed the pass condition threshold, a pass condition 77 can be determined. Hence, the counter(s) within the failure condition determination module 76 can incrementally count the designated output 74 from each iteration, designating one of a fault-flagged and a pass-flagged average confidence factor, and compare the sum of the designated outputs 74 designated as fault-flagged to the failure condition threshold and compare the sum of the designated outputs 74 designated as pass-flagged to the pass condition threshold. In an exemplary embodiment, the failure condition threshold corresponds to a maximum number of average confidence factors designated as fault-flagged allowed during a drive cycle (e.g., current drive cycle) before a failure condition is determined.

In response to the determined failure condition 78 in the hydraulic circuit, the control module 5 may execute a control action. The control action can include recording a diagnostic trouble code corresponding to the determined failure condition 78. Further, the control action can include displaying a message corresponding to the failure condition 78. The displayed message can include a service warning displayed upon an instrument panel or a human machine interface within the vehicle. If the plurality of detected fault conditions exceeding the failure condition threshold are all positive fault-flags having a value of "1," the determined failure condition 78 is indicative of insufficient hydraulic fluid levels within the hydraulic circuit 11. Similarly, if the plurality of detected fault conditions exceeding the failure condition threshold are all negative fault-flags each having a value of "(−1)," the determined failure condition 78 is indicative of hydraulic fluid blockage within the hydraulic circuit. It will be appreciated that when a failure condition has been determined, components within the transmission (e.g., direct drive transmission) may not be adequately cooled and lubricated even though the transmission is still capable of providing motive torque. Failure to service the failure condition can result in damage to the transmission components.

In an exemplary embodiment of the present disclosure, the counter within the failure condition determination module 76 is reset during a subsequent drive cycle if the plurality of detected fault conditions does not exceed the failure condition threshold. However, when a failure condition is determined when the plurality of detected fault conditions exceed the failure condition threshold, the failure condition can be maintained at the initiation of the subsequent drive cycle. During the subsequent drive cycle, the plurality of detected acceptance conditions can be monitored by the counter within the failure condition determination module 76. The plurality of detected acceptance conditions during the subsequent drive cycle can be compared to the pass condition threshold. The maintained failure condition that was determined in the previous drive cycle can be reset if the plurality of detected acceptance conditions exceed the pass condition threshold during the subsequent drive cycle.

In an alternative embodiment, the utilization of determining a confidence factor is not required for determining a failure condition in the hydraulic circuit 11. With reference to the HCFD controller 200 of FIG. 2, a current torque deviation (i.e., torque deviation 68) based on a deviation in the actual pump torque 64 from the desired pump torque 66 can be input directly to the EWMA filter 60.

Figure 3:
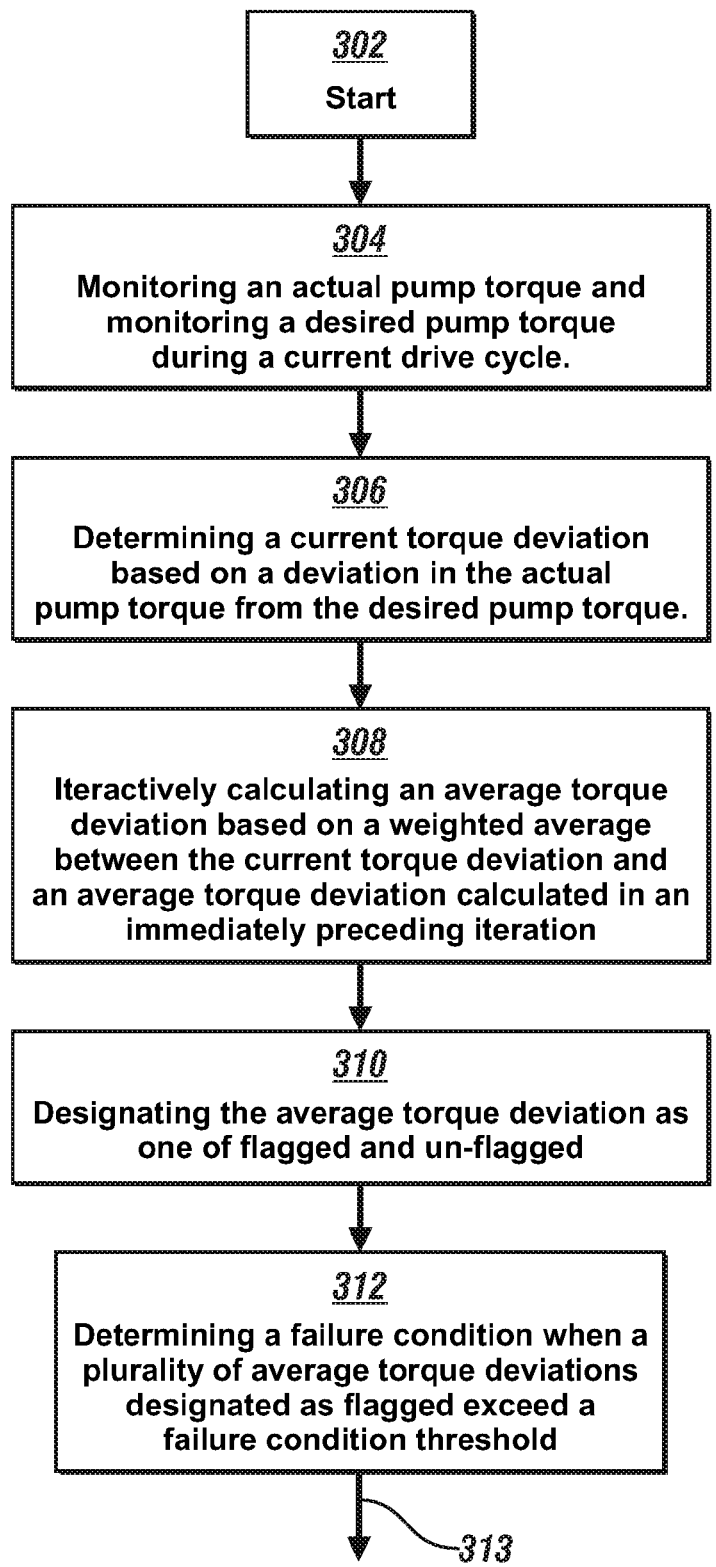
FIG. 3 illustrates a flow chart for determining a failure condition in the hydraulic circuit utilizing the HCFD controller 200 of FIG. 2.

In the alternative embodiment, FIG. 3 illustrates a flow chart 300 for determining a failure condition in the hydraulic circuit utilizing the HCFD controller 200 of FIG. 2 in accordance with the alternative embodiment of the present disclosure. Table 1 is provided as a key to FIG. 3 wherein the numerically labeled blocks and the corresponding functions are set forth as follows.

TABLE 1

| BLOCK | BLOCK CONTENTS |
|---|---|
| 302 | Start |
| 304 | Monitoring an actual pump torque and monitoring a desired pump torque during a current drive cycle. |
| 306 | Determining a current torque deviation based on a deviation in the actual pump torque from the desired pump torque. |
| 308 | Iteratively calculating an average torque deviation based on a weighted average between the current torque deviation and an average torque deviation calculated in an immediately preceding iteration |
| 310 | Designating the average torque deviation as one of flagged and un-flagged |
| 312 | Determining a failure condition when a plurality of average torque deviations designated as flagged exceed a failure condition threshold |

The flowchart 300 starts at block 302 and proceeds to block 304. Block 304 monitors an actual pump torque and monitors a desired pump torque during a current drive cycle. The current drive cycle can be initiated in response to a key-on event and terminated in response to a key-off event. The desired pump torque includes a target pump torque required to achieve a pump speed request for maintaining desired flow characteristics of hydraulic fluid for providing lubrication and temperature management within the hydraulic circuit. The flowchart proceeds to block 306.

Block 306 determines a current torque deviation based on a deviation in the actual pump torque from the desired pump torque. The flowchart 300 proceeds to block 308. Block 308 iteratively calculates an average torque deviation based on a weighted average between the current torque deviation and an average torque deviation calculated in an immediately preceding iteration. An exponentially weighted moving average filter can be utilized to iteratively calculate the average torque deviation. The average torque deviation can be calculated utilizing Eq. [1], wherein the term "torque deviation" replaces the term "confidence factor." The flowchart proceeds to block 310.

Block 310 designates the average torque deviation as one of flagged and un-flagged. Specifically, the average torque deviation calculated in block 308 is compared to a fault condition threshold. The average torque deviation is designated as flagged when the average torque deviation is greater than the fault condition threshold. The average torque deviation is designated as un-flagged when the average torque deviation is not greater than the fault condition threshold. The average torque deviation designated as flagged can include the average torque deviation having a positive flag, wherein the positive flag can correspond to a detected fault condition in the average torque deviation indicative of insufficient hydraulic fluid levels within the hydraulic circuit. Likewise, the average torque deviation designated as flagged can include the average torque deviation having a negative flag, wherein the negative flag can correspond to a detected fault condition in the average torque deviation indicative of hydraulic fluid blockage within the hydraulic circuit. The flowchart proceeds to block 312.

Block 312 determines a failure condition in the hydraulic circuit when a plurality of average torque deviations designated as flagged exceed a failure condition threshold. Each flagged average torque deviation can be monitored utilizing a counter. The failure condition threshold can correspond to a maximum number of average torque deviations designated as flagged allowed during a drive cycle before a failure condition is determined. If the fault condition is determined, a failure output 313 can execute a control action including at least one of recording a diagnostic trouble code corresponding to the determined failure condition and displaying a message corresponding to the determined failure condition.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for detecting a fault condition in a vehicular hydraulic circuit during a drive cycle using an electric pump comprising:
   within a control module:
       monitoring an actual electric pump torque and a desired electric pump torque;
       controlling the electric pump to achieve the desired electric pump torque; and
   within a hydraulic circuit failure determination controller comprising a computerized processor imbedded in the control module, operating programming configured to:
       iteratively determine a current confidence factor based on the actual electric pump torque and the desired electric pump torque;
       diagnose through the iteratively determined confidence factors the fault condition comprising one of a blocked hydraulic line and a low hydraulic fluid level, comprising:
           applying a statistical filter comprising a weighted factor increasing statistical weight of recent confidence factor values, wherein the statistical filter is calibrated to:
               filter out anomalous confidence factor values; and
               calculate an average confidence factor;
           comparing the average confidence factor to a fault condition threshold;
           detecting a fault condition when the average confidence factor is less than the fault condition threshold; and
           diagnosing the detected fault condition as one of the blocked hydraulic line fault condition and the low hydraulic fluid level fault condition based upon a comparison of the actual electric pump torque and the desired electric pump torque; and execute a control action in response to the determined failure condition comprising at least one of,
recording a diagnostic trouble code corresponding to the determined failure condition, and
displaying a message corresponding to the determined failure condition.

2. The method of claim 1 wherein the monitored actual pump torque is measured at an output shaft of an electric motor that drives the electric pump.

3. The method of claim 1 wherein the desired pump torque comprises a target pump torque required to achieve a pump speed request for maintaining desired flow characteristics of hydraulic fluid for lubrication and temperature management within the hydraulic circuit.

4. The method of claim 1 wherein determining the current confidence factor comprises:
determining a torque deviation based on a deviation in the actual pump torque from the desired pump torque;
monitoring a current pump speed; and
determining the current confidence factor as a function of the torque deviation at the current pump speed.

5. The method of claim 1 wherein the statistical filter comprises an exponentially weighted moving average (EWMA) filter.

6. An apparatus, comprising:
an electric motor;
a sump for storing a hydraulic fluid;
a hydraulic circuit comprising at least a lubrication and temperature management subsystem for lubricating and cooling transmission components;
an electric pump comprising the electric motor and pump and having an inlet port in fluid communication with the sump and an outlet port for providing the hydraulic fluid to the hydraulic circuit; and
a hydraulic circuit failure determination controller comprising a computerized processor, operating programming configured to:
monitor an actual electric pump torque and a desired electric pump torque;
iteratively determine a current confidence factor based on the actual electric pump torque and the desired electric pump torque;
diagnose through the iteratively determined confidence factors the fault condition comprising one of a blocked hydraulic line and a low hydraulic fluid level;
comprising:
applying a statistical filter comprising a weighted factor increasing statistical weight of recent confidence factor values, wherein the statistical filter is calibrated to:
filter out anomalous confidence factor values; and
calculate an average confidence factor;
diagnose the fault condition rapidly through a trend in the recent confidence factor values; and
comparing the average confidence factor to a fault condition threshold;
detecting a fault condition when the average confidence factor is less than the fault condition threshold; and
diagnosing the detected fault condition as one of the blocked hydraulic line fault condition and the low hydraulic fluid level fault condition based upon a comparison of the actual electric pump torque and the desired electric pump torque; and
execute a control action in response to the determined failure condition comprising at least one of,
recording a diagnostic trouble code corresponding to the determined failure condition, and
displaying a message corresponding to the determined failure condition.

7. The apparatus of claim 6 wherein the monitored actual pump torque is measured at an output shaft of the electric motor.

8. The apparatus of claim 6 wherein monitoring the actual pump torque comprises: monitoring an actual pump speed; and
determining the actual pump torque based upon the actual pump speed.

9. The apparatus of claim 6 wherein the statistical filter comprises an exponentially weighted moving average (EWMA) filter.

* * * * *